United States Patent
Larcher et al.

(10) Patent No.: US 6,360,986 B1
(45) Date of Patent: Mar. 26, 2002

(54) PROCESS AND DEVICE FOR GUIDING A FLYING CRAFT, IN PARTICULAR A MISSILE, ONTO A TARGET

(75) Inventors: Eric Larcher, Général de Gaulle; Cyril Delmau, Rue Claude Lorrain, both of (FR)

(73) Assignee: Aerospatiale Matra, Paris (FR)

( * ) Notice: Subject to any disclaimer, the term of this patent is extended or adjusted under 35 U.S.C. 154(b) by 0 days.

(21) Appl. No.: 09/509,480

(22) PCT Filed: Sep. 1, 1999

(86) PCT No.: PCT/FR99/02080

§ 371 Date: Mar. 28, 2000

§ 102(e) Date: Mar. 28, 2000

(30) Foreign Application Priority Data

Sep. 2, 1998 (FR) .............................................. 98 10947

(51) Int. Cl.$^7$ ........................... F41G 7/20; F42B 10/02; F42B 15/01
(52) U.S. Cl. ....................... 244/3.15; 244/3.16; 244/3.21
(58) Field of Search ............................... 244/3.13, 3.15, 244/3.16–3.3; 342/97

(56) References Cited

U.S. PATENT DOCUMENTS

| | | | |
|---|---|---|---|
| 3,741,502 A | * 6/1973 | Schroader et al. | ......... 244/3.13 |
| 3,918,060 A | * 11/1975 | Alpers | .......................... 342/97 |
| 4,168,813 A | 9/1979 | Pinson et al. | |
| 4,176,814 A | * 12/1979 | Albrektsson et al. | ...... 244/3.15 |
| 4,408,735 A | * 10/1983 | Metz | ......................... 244/3.22 |
| 4,641,801 A | * 2/1987 | Lynch, Jr. et al. | ......... 244/3.14 |
| 5,626,311 A | * 5/1997 | Smith et al. | ............... 244/3.16 |
| 5,647,560 A | 7/1997 | Schnatz et al. | |

FOREIGN PATENT DOCUMENTS

| EP | 0751367 | | 1/1997 |
|---|---|---|---|
| GB | 2345952 A | * | 7/2000 |

* cited by examiner

*Primary Examiner*—Bernarr E. Gregory
(74) *Attorney, Agent, or Firm*—Stevens, Davis, Miller & Mosher, LLP

(57) ABSTRACT

The present invention relates to a process and a device for guiding a flying craft onto a target, the device (1) comprising a detector (D) pointed at the target in such a way that a projection of the latter is situated on a field of measurement of the detector (D), a computation unit (UC) for determining guidance commands, and members (6) carrying out the guidance. According to the invention, the said device (1) furthermore comprises computation means (C3, C4) for determining commands for varying attitudes of the said flying craft making it possible to center the said projection with respect to a first direction of the measurement field, and the line of sight of the detector (D) is moveable and is controlled in such a way as to center the said projection with respect to a second direction of the measurement field, which is different from the said first direction.

20 Claims, 3 Drawing Sheets

PROCESS AND DEVICE FOR GUIDING A FLYING CRAFT, IN PARTICULAR A MISSILE, ONTO A TARGET

The present invention relates to a process and a device for guiding a flying craft, in particular a missile, onto a target.

More precisely, the said process and device are intended for implementing autoguidance, that is to say guidance which can be carried out solely with the aid of the information available on the said flying craft.

In a known manner, for a missile, in particular an air-to-ground missile, such autoguidance is implemented in the terminal phase of the guidance, on approach to the target.

Generally, the said autoguidance is carried out with the aid of information supplied by a seeker head, and in particular of the information relating to the said target which is situated in a field of view of the said seeker head. To this end, the line of sight of the seeker head is continually servocontrolled.

In a known manner, such servocontrol exhibits different objects, depending on the guidance phase considered, and consisting:

before "lock-on", that is to say before actual detection of the target, in pointing the said seeker head within the assumed environment of the said target; and after "lock-on", in maintaining the target within the measurement field (restricted by design) of the said seeker head and in tracking the said target.

The guidance commands for the said flying craft are then deduced, in a known manner, by using the signals supplied by the seeker head tracking the target, the said guidance commands being implemented by the steering of the craft carrying out the commanded maneuvers in terms of pitch and yaw, possibly with roll servocontrol, either to keep the roll of the craft constant, or to distribute the aerodynamic load by performing an aerodynamic roll check of the craft so as to improve the aerodynamic characteristics such as the useable load factor, the load on the steering actuators, the roll torques induced, etc.

This standard solution of autoguidance nevertheless has a number of drawbacks. In particular, it is complex and expensive, since it requires, in a known manner, for its implementation, in addition to the seeker head detection system, several other expensive measurement and processing devices, in particular:

mechanical devices for rendering the line of sight moveable, with mobility according to at least two or three axes for guidance in space. These mechanical devices comprise, for example, articulations with a gimbal mounting and motorization of each axis;

measuring equipment and associated electronic means for monitoring line of sight servocontrol loops.

To remedy these drawbacks, it is known practice to use a detector, for example of the infrared or optical detection type, in particular laser detection, which is rigidly tied to the flying craft and which carries out the overall function of detection (location and identification) of the target.

However, such an implementation, which exhibits undeniable advantages relative to the aforesaid standard solution, requires a detector exhibiting a measurement field of considerable size so as, the flying craft being guided on a trajectory toward the target:

before lock-on, to have the target in the said measurement field, whilst taking into account, not only errors in objective designation and guidance of the craft, but also incidences of the said craft due to the disturbances of the environment (wind, effect of gravity, etc.) and to the achieving of the load factor; and after lock-on, continuing to maintain the target in the said measurement field.

Of course, the requirement of a considerable size for the field of measurement of the detector entails drawbacks, in particular in terms of cost, bulk, weight, etc.

The object of the present invention is to remedy these drawbacks and in particular to reduce the size of the field of measurement of the detector whilst remaining compatible with the effectiveness of guidance. It relates to a process for guiding a flying craft onto a target, the said guiding exhibiting various successive phases, including a terminal phase for which at least the guidance is carried out with the aid of measurements performed by a detector mounted on the said flying craft and pointed with its line of sight toward the said target so that a projection of the latter is situated on a field of measurement of the said detector, as well as with the aid of information, in particular navigation and inertial information, emanating from information sources mounted on the said flying craft.

To this end, according to the invention, the said process is noteworthy in that at least in the said terminal phase, attitudes of the said flying craft are controlled in such a way as to center the projection of the target with respect to a first direction of the said measurement field, in that the line of sight of the said detector is moveable about a second direction of the said field of measurement, which is different from the said first direction, and in that at least in the said terminal phase, the mobility of the line of sight of the said detector is controlled in such a way as to center the said projection of the target with respect to the said second direction.

Thus, since by virtue of the invention the projection of the target onto the field of measurement of the detector is automatically centered with respect to the said first and second directions which are orthogonal, respectively by controlling the attitudes of the flying craft and the mobility of the said line of sight, the said measurement field may exhibit a reduced size so that the said detector makes it possible to remedy the aforesaid drawbacks (cost, bulk, weight, etc.).

Advantageously, at least in the said terminal phase, the relative motion between the flying craft and the target is estimated, thus making it possible in particular to estimate the kinematics of the target with respect to the flying craft and thus to implement the process in accordance with the invention even:

when the projection of the target leaves the field of measurement of the detector; and even in flight phases for which such a projection does not exist or does not yet exist.

Moreover, advantageously, at least in the said terminal phase, attitudes of the said flying craft are controlled in such a way as to distribute the aerodynamic load over axes tied to the said flying craft.

Such a distributing of the aerodynamic load exhibits several advantages and makes it possible in particular:

to relieve the actuators of the steering control surfaces of the flying craft; and to increase the total steerable domain of incidence.

Moreover, advantageously, the roll of the flying craft is controlled as attitude of the latter.

Thus, since the guidance of the flying craft is carried out in a standard manner in terms of pitch and yaw, the (roll)

control in accordance with the invention with a view to the centering and, as appropriate, the distributing of the aerodynamic load is compatible with the effectiveness of the guidance.

To determine a roll control command, use is preferably made for this purpose of the deviation measurement values determined at least from certain of the following information:

information relating to measurements performed by the said detector;

inertial information and navigational information; and information relating to the orientation of the line of sight of the detector, with respect to the flying craft.

In an advantageous mode of implementation, to simultaneously carry out a distributing of the aerodynamic load over axes tied to the flying craft and the centering of the projection of the target, the roll is controlled on the basis of a roll variation command $\Delta\phi co$ which satisfies the relation:

$$\Delta\varphi co = \begin{cases} \Delta\Delta\varphi coA, \text{ if the value } \Delta\varphi coA \text{ is defined between} \\ \text{values } \Delta\varphi co1 \text{ and } \Delta\varphi co2 \cdot \Delta\varphi coE, \text{ otherwise} \end{cases}$$

in which:

$\Delta\phi coA$ is a standard roll variation command for distributing the aerodynamic load;

$\Delta\phi co1$ and $\Delta\phi co2$ are roll variation commands determined from the actual state of the said flying craft; and $\Delta\phi coE$ is a roll variation command determined from the said commands $\Delta\phi co1$ and $\Delta\phi co2$.

Moreover, advantageously, the said roll variation commands $\Delta\phi co1$ and $\Delta\phi co2$ respectively satisfy the following relations:

$$\tan\Delta\varphi co1 = \frac{U1 + U01}{\left[\frac{|U2|}{e} + K\right] \times \text{Sign}(U2)}$$

$$\tan\Delta\varphi co2 = \frac{U1 - U02}{\left[\frac{|U2|}{e} + K\right] \times \text{Sign}(U2)}$$

in which:

tan represents the tangent;

e, K, U01 and U02 are predetermined values; and

U1 and U2 are deviation measurement values.

In order to increase the performance of the processing implemented, advantageously, the said deviation measurement values U1 and U2 respectively satisfy the following relations:

$$U1 = \theta^+ EBZu$$

$$U2 = \theta^+ EBYu$$

in which $\theta^+EBZu$ and $\theta^+EBYu$ respectively represent deviations in pitch and yaw attitudes with respect to the craft/target straight line which are determined, on the one hand from pitch and yaw attitudes prescribed by the guidance of the flying craft and, on the other hand, from current pitch and yaw attitudes of the flying craft.

Furthermore, advantageously, the controlled deviations of attitudes with respect to the craft/target straight line are limited to predetermined values, thus making it possible in particular to limit the guidance of the flying craft with respect to the pointing of the target and hence to favor this pointing.

With this in mind, in a particular embodiment, commands for controlling variations in attitudes are determined in such a way as to favor, according to the flight phase considered, at least one of the following actions: the guidance of the flying craft, the centering of the projection of the target on the detector and the distributing of the aerodynamic load.

Additionally, the said flying craft can be guided in such a way as to limit its kinematic incidence and its kinematic sideslip, at least in an ultimate phase of the said terminal phase, that is to say preferably just before contact with the target, in particular so as to favor the effectiveness of the destruction of the latter.

The present invention also relates to a device for guiding a flying craft onto a target, the said device comprising:

information sources generating information relating to the said flying craft;

a detector capable of carrying out measurements relating to the target, and mounted on the said flying craft and pointed with its line of sight toward the said target so that a projection of the latter is situated on a field of measurement of the said detector;

a computation unit for determining, from the said information and the said measurements, at least in a terminal phase of the said guidance, guidance commands; and steering members carrying out the guidance of the said flying craft as a function of the said guidance commands.

According to the invention, the said device is noteworthy in that it moreover comprises computation means for determining commands for varying attitudes of the said flying craft making it possible to center the projection of the said target with respect to a first direction of the said measurement field, the said attitude variation commands being transmitted to the said steering members, in that the said detector exhibits a line of sight which is moveable according to a second direction of the measurement field, which is different from the said first direction, in that the device in accordance with the invention comprises orientation means controllable so as to orient the said line of sight of the detector, and in that the said computation means control the said orientation means in such a way as to obtain the centering of the said projection of the target with respect- to the said second direction.

Thus, the device in accordance with the invention is uncomplicated and inexpensive.

Moreover, advantageously, the said device comprises:

a means for estimating the relative motion between the flying craft and the target. The estimations thus carried out may be used to increase the accuracy and performance of the device and also to offset the absence of the projection of the target in the measurement field; and/or a means for supervising the said device, which is preferably formed in such a way as to favor, according to the flight phase considered, at least one of the following actions:

the centering of the projection of the target on the measurement field of the detector;

the guidance of the flying craft; and the distributing of the aerodynamic load over axes tied to the said flying craft.

Furthermore, to simplify the embodiment advantageously, the said computation means are integrated into the said computation unit.

Additionally, advantageously, the mobility of the said line of sight corresponds to an orientation about an axis tied to the craft. The device according to the invention therefore requires few moveable parts, the mobility being implemented according to a single axis, and with motorization which may be crude, as stated hereinbelow, whilst retaining a reduced size of the measurement field.

Furthermore, in a preferred embodiment, the said orientation means comprise:

- an optical relay system, comprising for example a fixed mirror, a moveable mirror and a focusing optic;
- a motor, preferably a torque motor; and
- a means of duplicating the orientation comprising, for example, a potentiometer.

The figures of the appended drawing will clearly elucidate the manner in which the invention may be embodied. In these figures, identical references denote similar elements.

DESCRIPTION OF THE INVENTION

Figure 1:
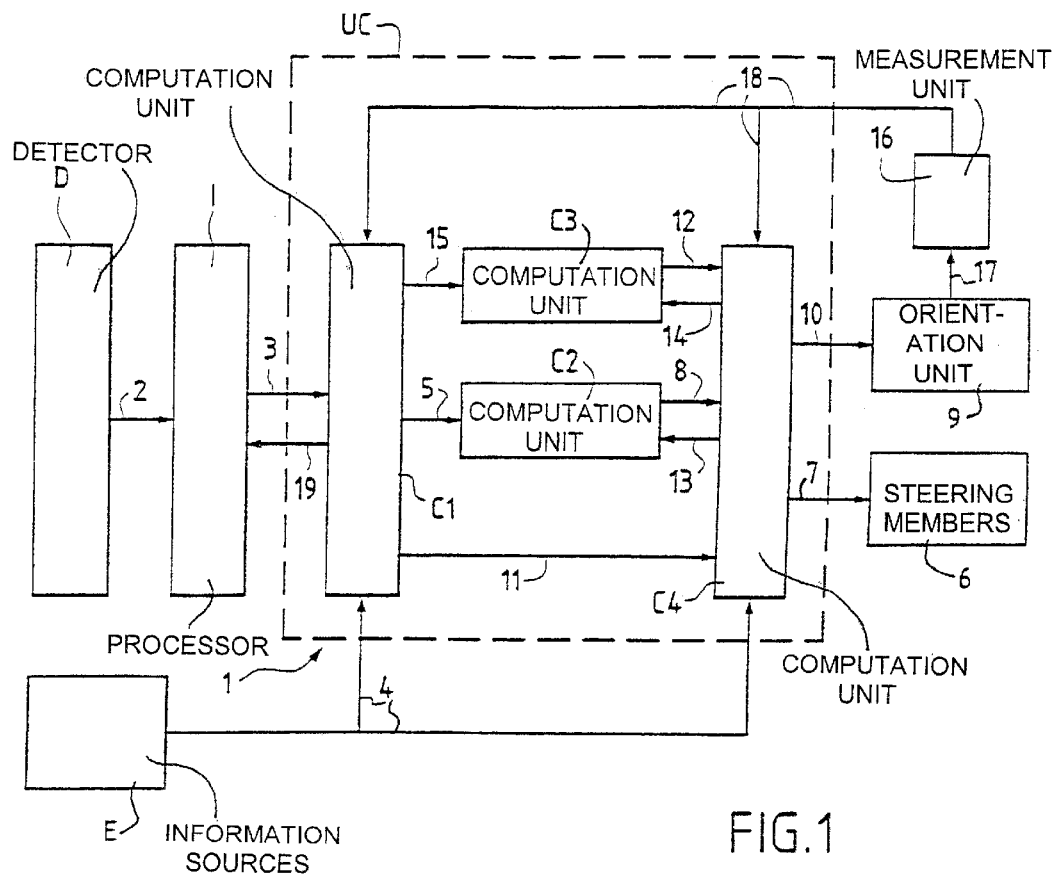
FIG. 1 is the schematic diagram of a device in accordance with the invention.
Figure 2:
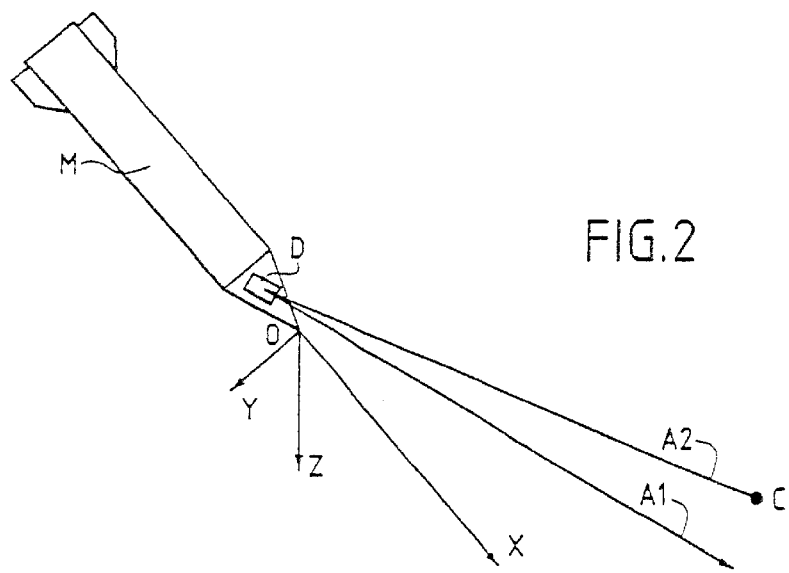
FIG. 2 diagrammatically illustrates a flying craft furnished with a device according to the invention and guided toward a target.

The device 1 in accordance with the invention and represented diagrammatically in FIG. 1 is intended for guiding a flying craft, for example a missile M toward a target C, such as represented in FIG. 2.

Indicated moreover in FIG. 2 is a reference frame OXYZ relating to the said missile M and such that:

OX represents the longitudinal axis of the said missile M;

OY and OZ represent two perpendicular axes of the plane passing through O and perpendicular to OX.

Also provided are directions $Y^+$ and $Z^+$ such that $OXY^+Z^+$ is another reference frame tied to the flying craft M, deduced from the reference frame OXYZ by a rotation of constant angle about OX and such that the line of sight of the detector D exhibits mobility about $Y^+$, corresponding to the rotation an angle EA in such a way as to form directions A1 and Za which are deduced from X and $Z^+$ through the said rotation of angle EA, A1 corresponding to the line of sight of the detector (A, Ya=$Y^+$, Za) corresponding to the measurement plane of the detector D, A being a point of the measurement field CM.

The unit vectors of the systems of axes (X, Y, Z), (X, $Y^+$, $Z^+$) are denoted $(\vec{X},\vec{Y},\vec{Z}),(\vec{X},\vec{Y^+}\vec{Z^+})$, respectively.

The said device 1 is of the type comprising:

- a detector D, for example infrared or optical, in particular of the laser type, which is pointed at the said target C and which supplies information relating to the target and to its environment;
- processing means I, for example image or laser spot processing means, which on the basis of the information supplied by the detector D, by way of a link 2, supply measurements relating to the target C, namely at least deviation measurements representative of the angular deviation between the measurement axis A1 relating to the said detector D and a reference axis A2. According to the invention, the said reference axis A2 corresponds to the straight line passing through a reference point of the said detector D and a point of the said target C, which point is detected by the said detector D;
- a set E of information sources mounted on the said missile M and capable of delivering information relating to the said missile M, in particular inertial and navigational information;
- a computation means C1 which is linked, by way of links 3 and 4, respectively to the said processing means I and to the said set E of information sources and a computation means C2 which is linked by a link 5 to the said computation means C1 and which determines, from measurements and from information received, commands for guidance along the said axes OY and OZ, of the tracking or proportional navigation type, as specified hereinbelow. According to the invention, the said computation means C1 reconstructs the direction of the reference axis A2 and estimates the kinematics thereof from information emanating from the processing means I, from the set E of the information sources and from a measurement means 16, all of which are specified hereinbelow, the reconstruction being performed after rephazing all this information; and
- steering members 6 which carry out the guidance of the missile M on the basis of guidance commands received by way of a link 7 from a computation means C4 linked by a link 8 to the computation means C2.

It will be noted that before lock-on (or detection) of the target C by the detector D and even after (according to the mode of embodiment), the deviation measurements are replaced by an estimate of the said deviation measurement, on the basis of navigation information for the missile M, which information is associated with an inertial reference, and of an estimated positioning of the target C.

Moreover, the computation means C2 makes it possible to determine commands for guidance along the said axes OY and OZ, of the tracking or proportional navigation type or standard guidance laws (optimal laws, integrated laws, etc.) which can be reduced to commands to the craft M, along axes OY and OZ, for controlled acceleration $\vec{\Gamma co}=\Gamma Yco$ $\vec{Y}+\Gamma Zco\vec{Z}$ or controlled angular velocity $\vec{\Omega co}=\Omega Yco$ $\vec{Y}+\Omega Zco\vec{Z}$ or to variations in the direction of the controlled velocity vector $\vec{\Delta\gamma co}=\Delta\gamma Yco\vec{Y}+\Delta\gamma Zco\vec{Z}$ or to variations in controlled attitude $\vec{\Delta\theta co}=\Delta\theta Yco\vec{Y}+\Delta\theta Zco\vec{Z}$.

It will be noted that the processing operations for estimating the craft/target kinematics implemented by the computation means C1 supply all the data involved in formulating the controlled accelerations, such as deviations between the craft axis and the craft/target straight line or between the axis of the velocity vector and the craft/target straight line, the craft/target straight line rotation velocity, the craft/target distance, the craft/target close-in speed, etc.

Figure 3:
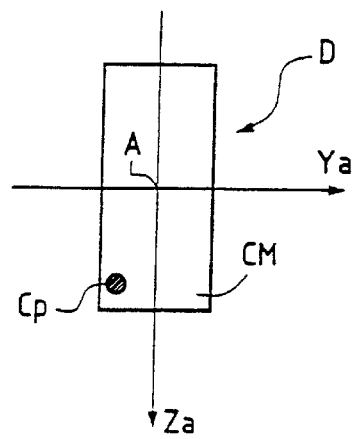
FIG. 3 diagrammatically shows a field of measurement of a detector in accordance with the invention.

As may be seen in FIG. 3, the detector D exhibits the measurement field CM defined by a plane AYaZa comprising the projection Cp of the target C, which illustrates the position of the latter. The said point A is situated at the center of the said measurement field CM.

According to the invention:

the said device 1 furthermore includes computation means C3 and C4 capable of determining control commands specified hereinbelow for the missile M making it possible to modify the position of the missile M in such a way as to center the said projection Cp (of the target C on the measurement field CM) with respect to the direction AZa;

the said detector D exhibits a line of sight A1 which is mobile about the direction AYa of the measurement field CM;

the said device 1 comprises for this purpose orientation means 9 controllable so as to displace the said line of sight A1 of the detector D; and the said computation means C4 control the said orientation means 9 through a link 10 in such a way as to obtain the centering of the said projection Cp of the target C with respect to the said direction AYa.

Thus, since the projection Cp is automatically centered, to within a tolerance, according to these directions AYa and AZa, the measurement field CM can exhibit a reduced size, which makes it possible to remedy the drawbacks (cost, bulk, weight, etc.) due to a considerable measurement field.

It will moreover be noted that, according to the invention:

the computation means C4 linked to the computation means C1, C2 and C3 respectively by links 11, 8 and 12 formulates controls for orienting the line of sight about an axis tied to the craft M and controls transmitted to the steering members 6 for the roll, pitch and yaw maneuvers; and the computation means C3 determines the deviations between the unit vector $\overrightarrow{uEB}$ of the craft/target straight line, corresponding to the axis A2, and the unit vector $\overrightarrow{X}$ of the longitudinal axis of the flying craft M, for example under the vector formulation, $\theta \overrightarrow{EB} = \overrightarrow{uEB} \wedge \overrightarrow{X}$, thereby defining deviations according to the axes Y, Z or $Y^+$, $Z^+$ satisfying: $\theta \overrightarrow{EB} = \overrightarrow{uEB} \wedge \overrightarrow{X} = \theta EBY \overrightarrow{Y} + \theta EBZ \overrightarrow{Z} = \theta^+ EBY Y^+ + \theta' EBZ Z^+$ Furthermore, as may be seen in FIG. 1:

the computation means C4 is linked to the computation means C2 and C3 by return links 13 and 14;

the computation means C3 is linked to the computation means C1 by a link 15;

the processing means I are linked by a return link 19 to the computation means C1;

the means 16 of measuring the orientation of the line of sight is associated with the orientation means 9, as is illustrated by a link 17, and is linked by a link 18 to the computation means C1 and C4; and the said computation means C1 to C4 are integrated into a central unit UC.

In a preferred embodiment, the said computation means C4 computes, according to the invention, a roll control command Δϕco transmitted to the steering members 6 by the link 7, which then generate a corresponding rotation of the missile M about the axis OX.

Figure 4A:
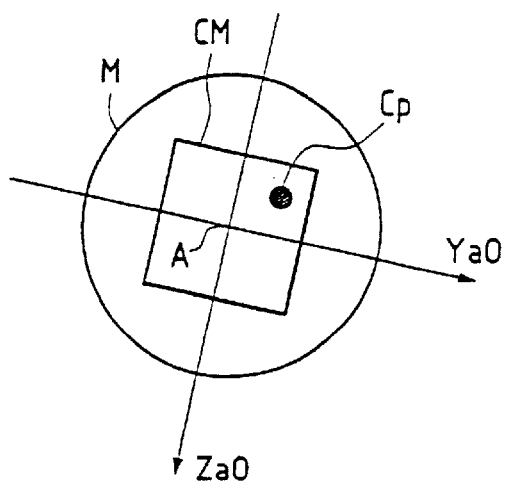
FIGS. 4A to 4D show the said measurement field in three different positions (FIGS. 4B and 4C showing the same position) making it possible to illustrate the effects of the controls in accordance with the invention.
Figure 4B:
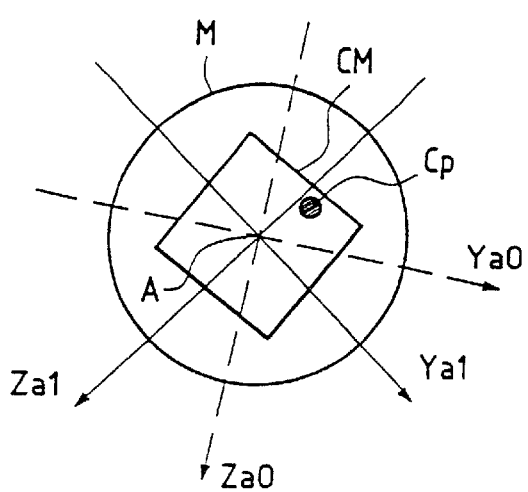
Figure 4C:
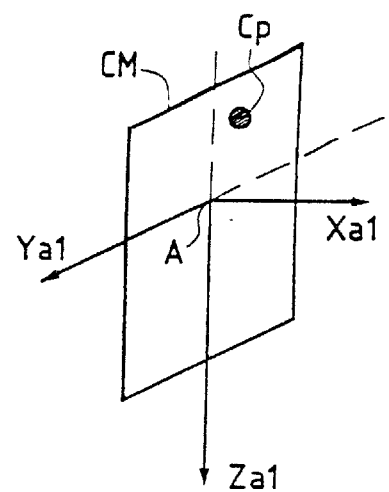

The effect due to this roll control in respect of the centering of the deviation measurement is demonstrated by comparing FIG. 4A with FIGS. 4B and 4C which illustrate the same situation:

FIG. 4A illustrating the situation where the projection Cp is not centered, neither with respect to the axis AZa, nor with respect to the axis AYa, the position of the measurement field CM being defined in this off-centered position by axes AYaO and AZaO; and FIGS. 4B and 4C illustrating the situation after the centering due to the said roll control in accordance with the invention. The measurement field CM is then in a position defined by axes AYa1 and AZa1.

It will be noted that FIGS. 4A and 4B diagrammatically show the rear of the missile M with the position of the measurement field CM.

Figure 4D:
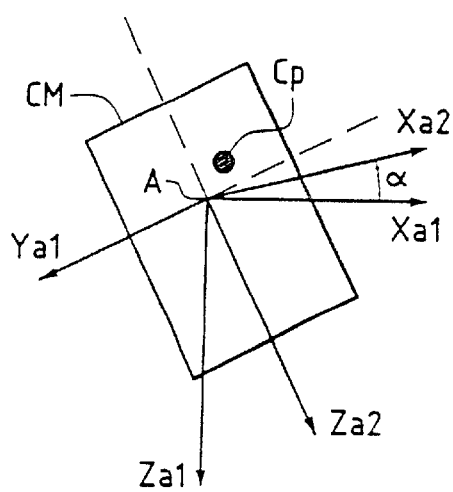

Moreover, the effect on the position of the projection Cp, due to the action of the means 9, is demonstrated by comparing FIGS. 4B and 4C with FIG. 4D, the latter illustrating the situation after the centering procured by displacing the line of sight A1. The new position of the measurement field CM is defined by the axis AYa1 and an axis AZa2. The line of sight A1 is situated along an axis AXa2 which is deduced from the axis AXa1 by a rotation by an angle α.

According to the invention, the said control command Δϕco is computed from deviation measurement values which are representative of the deviation measurement between the axes OX and A2 and which are determined by the computation means C1 and C3, on the basis of processing operations performed by the means I and/or of the information supplied by the said set E of information sources, and of the aerodynamic acceleration prescribed by the guidance. The aerodynamic acceleration prescribed by the guidance is deduced, in the standard manner, from the guidance controls (in terms of acceleration or angular velocity, or in terms of variation in the direction of the velocity vector or in terms of attitude variant), by taking into account the aerodynamic transfer functions of the flying craft M and the known transfers of the airframe of the flying craft M tying the angular velocities of the airframe to its acceleration, with compensation for gravity.

In a preferred embodiment, the command Δ100 co lies between $-\pi$ and $\pi$ and is defined from the expression:

$$\Delta\varphi co = \begin{cases} \Delta\varphi coA, & \text{if } \Delta\varphi coA \text{ lies between controls } \Delta\varphi co1 \text{ and } \Delta\varphi co2 \\ \Delta\varphi coE, & \text{otherwise} \end{cases}$$

in which:

ΔϕcoA is a roll variation control for distributing the aerodynamic load, computed in a known manner from the relation:

$$\Delta\varphi A = \frac{|AZco| - |AYco|}{|AZco| + |AYco|} \times \text{Sign}(AYco \times AZco)$$

in which

AYco and AZco are controlled aerodynamic accelerations along the axes OY and OZ of the flying craft M and over which one wishes to distribute the aerodynamic load. The value of ΔϕA obtained through the above relation is limited to predetermined values. The value thus limited is taken as the value of ΔϕcoA, if the absolute values of AYco or AZco are of significant levels, for example larger than a predetermined threshold. Otherwise, the said value is replaced by a zero value;

Δϕco1 and Δϕco2 are controls in terms of roll variation with respect to the current state of the flying craft M, their object being to impart to the projection of the craft/target straight line in the measurement field CM of the detector D a component along $\overrightarrow{Y^+}$, corresponding to the direction about which the line of sight A1 is orientable; and ΔϕcoE is a control defined from the said controls Δϕco1 and Δϕco2, for example with the aid of the following logic:

$$\begin{cases} \Delta\varphi coE = \Delta\varphi co2, \text{ if } |\Delta\varphi coA - \Delta\varphi co1| > |\Delta\varphi coA - \Delta\varphi co2| \\ \Delta\varphi coE = \Delta\varphi co1, \text{ otherwise.} \end{cases}$$

In a particular embodiment, the roll variation controls or commands $\Delta\phi co1$ and $\Delta\phi co2$ are determined respectively from the following relations:

$$\tan\Delta\varphi co1 = \frac{U1 + U01}{\left[\frac{|U2|}{e} + K\right] \times \text{Sign}(U2)}$$

$$\tan\Delta\varphi co2 = \frac{U1 - U02}{\left[\frac{|U2|}{e} + K\right] \times \text{Sign}(U2)}$$

in which:
  tan represents the tangent;
  e, K, U01 and U02 are predetermined values which may vary according to the flight phases; and
  U1 and U2 are deviation measurement values.

According to the invention, the values U1 and U2 are computed on the basis of quantities which are supplied by the computation means C1 estimating the craft/target kinematics, which quantities are representative of deviations between the unit vector $\overrightarrow{uEB}$ of the straight line passing through the flying craft M at the level of the detector D and through the target C, and the unit vector $\overrightarrow{X}$ of the longitudinal axis OX of the said flying craft M and are calculated, for example, with the aid of the vector formulation $\theta^+EBY \overrightarrow{Y^-} + \theta^+EBZ \overrightarrow{Z^+} = \overrightarrow{uEB} \wedge \overrightarrow{X}$. The values of U1 and U2 may then be chosen such that: $U1=\theta^+EBZ, U2=\theta^+EBY$.

The values $\Delta\phi co1$ and $\Delta\phi co2$ are computed only if the variable U2 exhibits an absolute value greater than a predetermined value or if the mathematical expression $\sqrt{U1^2+U2^2}$ exhibits a value greater than a predetermined value.

Otherwise, the said values $\Delta\phi co1$ and $\Delta\phi co1$ and $\Delta\phi co2$ are replaced by zero values.

The values of $\Delta\phi co1$ and $\Delta\phi co2$ thus obtained, are preferably, limited to predefined limit values.

In particular embodiments, the knowledge of the attitudes controlled by the guidance can be exploited in order to modify the attitude controls of the flying craft M, as specified hereinbelow.

For this purpose, in a first embodiment, use is made of transfer functions peculiar to the said flying craft M, between the variation $\Delta\Gamma Z$ of the acceleration $\Gamma Z$ of the craft M along the axis OZ and the variation $\Delta\Omega Y$ of the speed of rotation $\Omega Y$ of the craft M about the axis OY, of the type:

$$\frac{\Delta\Omega Y}{\Delta\Gamma Z} = H(s),$$

$=H(s)$, (laplace variable s)
or between the variation $\Delta\gamma Y$ of the direction of the velocity vector and the variation in the speed of rotation of the flying craft M, of the type:

$$\frac{\Delta\Omega Y}{\Delta\gamma Y} = G(s).$$

$=G(s)$.

The attitude variation $\Delta\theta Yco$ prescribed by the guidance is deduced directly from the above, taking into account the information relating to the craft M as supplied by the set E of information sources, through a relation, expressed in laplace notation, of the type:

for acceleration guidance controls $\Delta\Gamma Zco$ $$\Delta\theta Yco = \left[\frac{H(s)}{s}\right] \cdot \Delta\Gamma Zco$$

for angular speed variation controls $\Delta\Omega Yco$ $$\Delta\theta Yco = \frac{\Delta\Omega Yco}{s}$$

for controls $\Delta\gamma Yco$ in terms of controlled speed direction variation, $$\Delta\theta Yco = \left[\frac{G(s)}{s}\right] \cdot \Delta\gamma Yco$$

Analogous relations are defined for the motion about the axis OZ (attitude variation $\Delta\theta Zco$) so that the attitude variations $\Delta\theta co$ prescribed by the guidance are:

$$\overrightarrow{\Delta\theta co} = \Delta\theta Yco \overrightarrow{Y} + \Delta\theta Zco \overrightarrow{Z}$$

or by changing reference frame and switching to the axes $\overrightarrow{Y^+}, \overrightarrow{Z^+}$:

$$\overrightarrow{\Delta\theta co} = \Delta\theta^+Yco \overrightarrow{Y^+} + \Delta\theta^+Zco\overrightarrow{Z^+}.$$

By taking into account the current pseudo-attitudes of the craft M, with respect to the craft/goal straight line, that is to say $\overrightarrow{\theta EB} = \theta EBY \overrightarrow{Y} + \theta EBZ \overrightarrow{Z} = \theta^+EBY \overrightarrow{Y^+} + \theta^+ EBZ \overrightarrow{Z^+}$, which are computed by the computation means C3, one deduces a pseudo-attitudes setting $\overrightarrow{\theta EBco} = \overrightarrow{\theta EB} + \overrightarrow{\Delta\theta co}$, which, expressed along the axes $Y^+$ and $Z^+$, makes it possible to define equivalent deviations controlled by the guidance:

$\theta^+EBYco=\theta^+EBY+\Delta\theta^+Yco$ $\theta^+EBZco=\theta^+EBZ+\Delta\theta^+Zco$ Moreover, the knowledge of these values, which is associated with the knowledge of the dynamics of response between the controls and the resulting execution, makes it possible to define deviations $\theta^+EBYu$ and $\theta^++EBZu$ (through a weighting of the current deviations and of the control deviations) which are capable of being used in the definition of the controls $\Delta\phi co1$ and $\Delta\phi co2$ by putting:

$U1=\theta^+EBZu, U2=\theta^+EBYu$.

Additionally, in a second embodiment, the pseudo-attitudes are controlled directly, by prescribing, in the processing operations carried out by the computation means C4 and relating to the pitch-wise and yaw-wise steering, a servocontrol of the said pseudo-attitudes.

These pseudo-attitudes can of course be limited.
For this purpose:
In a first variant, the pseudo-attitudes $\theta^+$EBYco and $\theta^+$EBZco are limited directly to predetermined values and a limited or "clipped" control $\overrightarrow{\theta EBco}=\theta$EBYco $\vec{Y}+\theta$EBZco$+\vec{Z}$ is deduced therefrom; whereas in a second variant, a non-"clipped" control $\overrightarrow{\theta EBcoNE}$, is taken into account, computed according to the aforesaid mode of computation for $\overrightarrow{\theta EBco}$ and decomposed into the form $\overrightarrow{\theta EB\infty NE}=\overrightarrow{\theta L\infty}$–EAu $\vec{Y}^+$, which involves an angle EAu corresponding to an approximation of the angle between the axis A1 and the axis OX. This angle is defined as a weighting (chosen as a function of the dynamics intervening in the effecting of the various controls formulated by the device 1) of two angles which correspond respectively to the current orientation and to the controlled orientation of the line of sight A1 with respect to the axis OX.

The said vector $\overrightarrow{\theta Lco}$ can be subjected to limitations about the line of sight A1, attitudes of the flying craft M, controlled in terms of pitch and yaw. The vector $\overrightarrow{\theta Lco}$ thus limited makes it possible to define a "clipped" control $\overrightarrow{\theta EBco}$, satisfying $\overrightarrow{\theta EBco}=\overrightarrow{\theta Lco}$–EAu$\vec{Y}^+$.

The various limitations effected are defined as a function of predetermined values, by taking into account in particular the size of the measurement field CM, information available on the computation and estimation means C1, the flight phase and what one wishes to favor between guidance and pointing of the target C. In particular, in the phase preceding lock-on to the target C, it may be advantageous to favor the pointing.

Within the context of the present invention, the attitudes $\theta^+$EBYu and $\theta^+$EBZu involved in the computation of the roll control may involve the attitudes $\theta^+$EBYco and $\theta^+$EBZco before or after the limitation, depending on whether one wishes to favor guidance or pointing of the target C.

Figure 5:
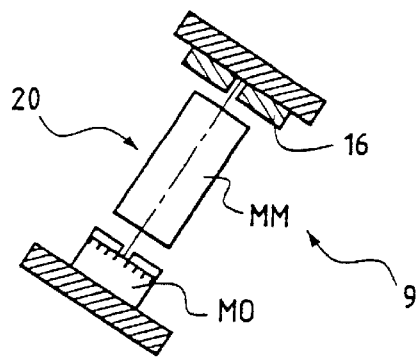
FIG. 5 diagrammatically shows means for orienting the line of sight of a detector.

According to the invention, the said orientation means 9 which are linked with the means 16 for measurement and for duplicating the orientation of the line of sight A1 comprise, as represented in FIG. 5:
  an orientable optical relay system 20, of known type, comprising optical elements, such as for example a mirror, a prism, etc. making it possible to modify the line of sight A1 of the detector D, as a function of its orientation; and
  a motor MO or an actuator, which comprises control electronics and which is controlled by the computation means C4 via the link 10, in such a way as to modify the orientation of the optical relay system 20.

According to the invention, the said motor MO can be a torque motor or a stepper motor.

In the latter case, it is possible to control the closest step to the position allowing the centering of the projection Cp.

It will be noted that, within the context of the present invention, one may be content with a crude motor, since the goal is not so much to obtain accurate centering as to bring the projection Cp close to the corresponding central direction, to prevent it from leaving the measurement field CM.

Of course, if the positions of the motor are predictable, the measurement means 16 is not necessary, this possibly being the case for example with bistatic motorization.

Figure 6:
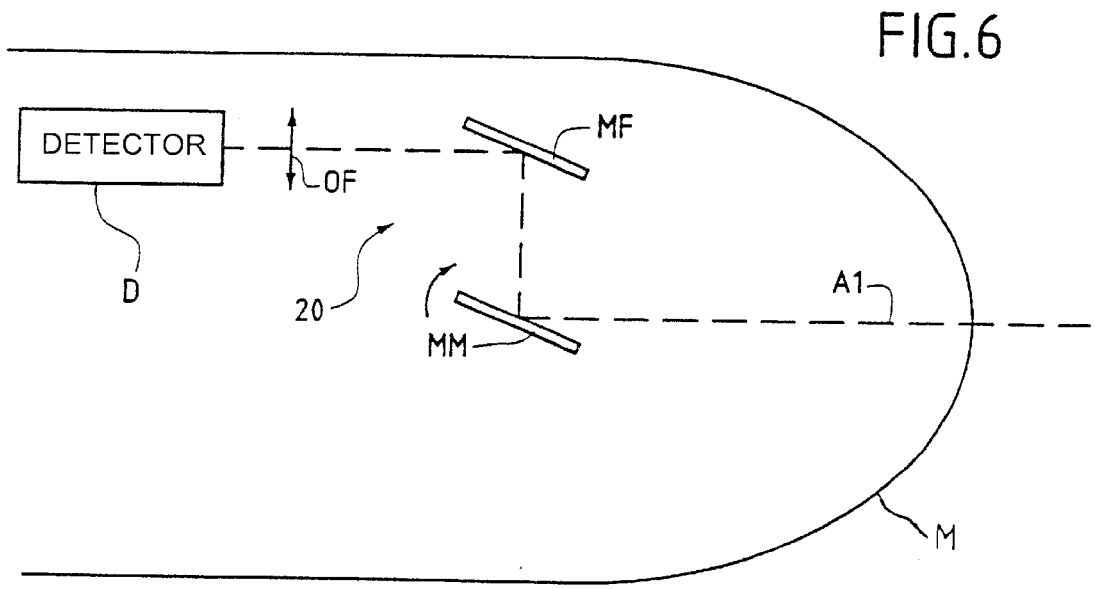
FIG. 6 diagrammatically illustrates an optical relay system of means of orienting the line of sight.

Furthermore, in a preferred embodiment represented in FIG. 6, the said optical relay system 20 comprises a fixed mirror MF, a moveable mirror MM and a focusing optic OF. The moveable mirror MM is displaced by way of the motor MO, the measurement means 16 measuring the rotation of the said mirror MM, thereby supplying a measurement of the orientation of the line of sight A1 with respect to the axis OX with a ratio of 2.

Additionally, it will be noted that the computation means C4 calculates the control for rotating the line of sight about $\vec{Y}^+$ through a control law of the tracking type, on the basis of information supplied by the computation means C1 carrying out the estimation of the craft/target kinematics and by the computation means C3 computing the deviation of the axis A1 with respect to the axis OX, by using angular velocities of the craft M as supplied by the set E of information sources. The computations are carried out so as to compensate for the angular motion of the craft M, so that, about the axis $Y^+$, of the line of sight A1 corresponds to a tracking the target C adapted to the various dynamics which intervene through the implementation of the invention and to the size of the measurement field CM.

What is claimed is:

1. A process for guiding a flying craft onto a target, said guiding exhibiting various successive phases, including a terminal phase for which at least the guidance is carried out with the aid of (a) measurements performed by a detector mounted on the flying craft and pointed with its line of sight toward the target so that a projection of the latter is situated on a field of measurement of said detector, and (b) information emanating from information sources mounted on the flying craft, wherein at least in said terminal phase, attitudes of the flying craft are controlled to center said projection of the target with respect to a first direction of said measurement field, in that the line of sight of said detector is moveable about a second direction of said field of measurement, which is different from said first direction, and in that, at least in said terminal phase, the mobility of the line of sight of said detector is controlled to center said projection of the target with respect to said second direction.

2. The process according to claim 1, wherein at least in said terminal phase, the relative motion between the flying craft and the target is estimated.

3. The process according to claim 1, wherein at least in said terminal phase, attitudes of the flying craft are controlled to distribute the aerodynamic load over axes tied to the flying craft.

4. The process according to claim 3, wherein, to simultaneously carry out a distributing of the aerodynamic load over axes tied to the flying craft and the centering of the projection of the target, the roll is controlled on the basis of a roll variation command A$\phi$co which satisfies the relation:

$$A\phi co=A\phi coA, \text{ if the value } A\phi coA \text{ is defined between values } A\phi co1 \text{ and } A\phi co2, A\phi coE \text{ A otherwise}$$

in which:
  A$\phi$coA is a roll variation command for distributing the aerodynamic load;
  A$\phi$co1 and A$\phi$co2 are roll variation commands determined from the actual state of the flying craft; and
  A$\phi$coE is a roll variation command determined from said commands A$\phi$co1 and A$\phi$co2.

5. The process according to claim 4, wherein said roll variation commands A$\phi$co1 and A$\phi$co2 respectively satisfy the following relations:

$$\tan\Delta\varphi co1 = \frac{U1 + U01}{\left[\frac{|U2|}{e} + K\right] \times \text{Sign}(U2)}$$

$$\tan\Delta\varphi co2 = \frac{U1 - U02}{\left[\frac{|U2|}{e} + K\right] \times \text{Sign}(U2)}$$

in which:

tan represents the tangent;

e, K, U01 and U02 are predetermined values and

U1 and U2 are deviation measurement values.

6. The process according to claim 5, wherein said deviation measurement values U1 and U2 respectively satisfy the following relations:

$$U1 = \theta^+ EBZu$$

$$U2 = \theta^+ EBYu$$

in which $\theta^+ EBZu$ and $\theta^+ EBYu$ respectively represent deviations in pitch and yaw attitudes of the flying craft with respect to a craft/target straight line which are determined, on the one hand, from pitch and yaw attitudes prescribed by the guidance of the flying craft and, on the other hand, from current pitch and yaw attitudes of the flying craft.

7. The process according to claim 1, wherein the roll of the flying craft is controlled as attitude of the latter.

8. The process according to claim 7, wherein deviation measurement values representative of the deviation measurement between a line of sight of the detector and a straight line passing through the detector and the target are used to determine a command for roll control.

9. The process according to claim 8, wherein said deviation measurement values are determined at least from certain of the following information:

information relating to measurements performed is by said detector;

inertial information and navigational information; and information relating to the orientation of the line of sight of the detector, with respect to the flying craft.

10. The process according to claim 1, wherein the controlled deviations of attitudes of the flying craft are limited to predetermined values.

11. The process according to claim 1, wherein commands for controlling variations in attitudes are determined to favor, according to the flight phase considered, at least one of the following actions: the guidance of the flying craft, the centering of the projection of the target on the detector and a distributing of the aerodynamic load over axes tied to the flying craft.

12. The process according to claim 1, wherein, at least in an ultimate phase of said terminal phase, the flying craft is guided to limit its kinematic incidence and its kinematic sideslip.

13. A device for guiding a flying craft onto a target, said device comprising:

information sources for generating information relating to the flying craft;

a detector for carrying out measurements relating to the target, and mounted on the flying craft and pointed with its line of sight toward the target so that a projection of the latter is situated on a field of measurement of said detector;

a computation unit for determining, from said information and said measurement, at least in a terminal phase of said guidance, guidance commands; and steering members for carrying out the guidance of the flying craft as a function of said guidance commands, wherein the device further comprises computation means for determining commands for varying attitudes of the flying craft making it possible to center the projection of the target with respect to a first direction of said measurement field, said attitude variation commands being transmitted to said steering members, in that said detector exhibits a line of sight which is moveable according to a second direction of the measurement field, which is different from said first direction, in that said device comprises orientation means controllable so as to orient said line of sight of the detector, and in that said computation means control said orientation means to center said projection of the target with respect to said second direction.

14. The device according to claim 13, further comprising means for estimating the relative motion between the flying craft and the target.

15. The device according to claim 13, further comprising means for supervising said device.

16. The device according to claim 15, wherein said means for supervising is formed to favor, according to the flight phase considered, at least one of the following actions:

the centering of the projection of the target on the measurement field of the detector;

the guidance of the flying craft; and a distributing of the aerodynamic load over axes tied to the flying craft.

17. The device according to claim 13, wherein said computation means are integrated into said computation unit.

18. The device according to claim 13, wherein said orientation means comprise an optical relay system, a motor and a means for duplicating the orientation.

19. The device according to claim 18, wherein said motor is a torque motor and said means for duplicating the orientation comprises a potentiometer.

20. The device according to claim 18, wherein said optical relay system comprises a fixed mirror, a moveable mirror and a focusing optic.

* * * * *